United States Patent [19]
Zeewy et al.

[11] 3,883,956
[45] May 20, 1975

[54] PROPORTIONAL CONTROL FOR GUIDANCE SYSTEM

[75] Inventors: Abraham Zeewy, University Heights; Donald Geringer, Parma, both of Ohio

[73] Assignee: Cecil Equipment Co., Inc., Medina, Ohio

[22] Filed: Dec. 26, 1972

[21] Appl. No.: 318,493

[52] U.S. Cl............... 33/23 K; 33/174 L; 33/169 R
[51] Int. Cl. ............................................... G01b 7/28
[58] Field of Search............ 73/105; 33/23 K, 23 C, 33/23 H, 174 L, 174 P, 27 K, 169 R, 172 E; 219/125 PL; 90/62

[56] References Cited
UNITED STATES PATENTS

| | | | |
|---|---|---|---|
| 3,171,012 | 2/1965 | Morehead | 219/125 PL |
| 3,408,475 | 10/1968 | Fier | 219/125 PL |
| 3,481,577 | 12/1969 | Fling | 90/62 |

*Primary Examiner*—Harry N. Haroian
*Attorney, Agent, or Firm*—Cain and Lobo

[57] ABSTRACT

A guidance system for seeking, following, and maintaining the position of a welding apparatus with respect to a seam or joint to be welded by sensing changes in the surfaces at or adjacent to the seam. A probe is included for detecting changes in the vertical and/or horizontal components of surfaces. A torch and the probe are mounted upon and positioned by motor-driven cross-slides, both horizontally and vertically. Within the probe are two resistors, variable in accordance with the displacement of a probe shaft engaging the surfaces. A voltage impressed upon each resistor is detected, amplified and applied to a trigger pulse generator, supplying power to the corresponding slide positioning motor through a silicon-controlled rectifier network. Variations in resistance change the time of the pulses generated and supply a voltage to the positioning motors corresponding in magnitude and polarity to the deviation. The motors are thereby enabled to correct the position of the probe and torch, both vertically and/or horizontally, simultaneously and at speeds proportional to the rates of change of the path. Braking action for each correction in proportion to the speed of correction is applied. A circuit for disabling the motors when the cross-slides reach their limits, unaffected by electromagnetic radiation, noise, transients and other pulses in the circuit, incorporates optical transistors and diodes which disable the circuit and brake the corresponding positioning motors when the normally closed limit switches open and permit current to flow through the diode to activate the transistor.

18 Claims, 12 Drawing Figures

PROPORTIONAL CONTROL FOR GUIDANCE SYSTEM

BACKGROUND OF THE INVENTION

1. Field of the Invention

This invention relates to improvements in guidance systems and, more particularly, to improvements in guidance systems of the type in which a probe is used for detecting and following a path defined by surfaces having vertical and horizontal components. 2. Description of the Prior Art Systems for guiding apparatus along a path defined by surfaces having vertical and horizontal components are particularly useful, for example, in guiding a welding head, torch, or the like, along the junction between two or more pieces of material to be welded or bonded together with a lap, butt or shaped butt joint having a groove, or the like. Such guiding systems frequently employ a probe, for detecting the juncture to be welded, mounted directly on the welding head or torch which follows the probe as a slave, or the like.

In one common apparatus, for example, the pieces of material to be welded together are placed in the desired relative position, then moved past the welding apparatus, which performs the desired welding operation upon them. As the pieces are moved, the probe, riding, for example, within a groove wherein the weld is to be effected, detects changes in the general direction of the groove or deviations in the surface defining the groove and transmits a signal or signals to the associated apparatus to correct the path of the welding head and the probe itself is to be mounted on a separate cross-slide apparatus of its own.

The probes employed on such systems usually include an elongated wire, shaft, or rod, mounted essentially coaxially within a body, frame or housing. The outer or exposed tip or finger of the wire shaft or rod rides or tracks within the groove or along the seam wherein or whereat the weld is to be effected. The opposite end of the wire, shaft or rod is disposed within the probe housing and is adapted to close (or open) a circuit to the respective positioning motor in accordance with the response to the movement of the top or finger as it travels along the groove or seam to be welded.

More particularly, the tip or finger is axially displaced, vertically and/or horizontally, as it comes into contact with the walls of the groove or seam and the opposite end is thereby caused to engage or disengage, if the probe is biased in the direction of movement, appropriate switches which actuate to deactuate the corresponding motor to position the torch in accordance with the path sensed by the probe tip.

Thus, the positioning motors are either in or out of operation and the cross-slides are either inoperable or operating at a fixed speed, without regard to the size or degree of the deviation from or change in the path of the seam (and, therefore, the probe) relative to basic direction of advance, horizontally and vertically, of the probe.

Alternatively, as shown in U.S. Patent application, Ser. No. 874,153 filed Nov. 5, 1969, the top or remote end of the probe is positioned to operate two switches controlling the movement of the positioning motor in one direction. In this instance a small change or deviation in the path of the particular component (horizontal or vertical) (i.e., relatively small movement of the tip or finger) actuates one switch supplying a low voltage to the motor with the result that a low correctional speed results and a larger movement of the tip or finger actuates the second switch to supply a larger voltage to the positioning motor which then operates the cross-slide at a second higher speed. Thus, providing a two-speed correction device.

Other prior art devices, such as that shown in U.S. Pat. No. 3,594,540, have suggested using a rotating switch carried at the top of the probe and adapted to vary the voltage delivered to the positioning motor by varying the position of the switch in accordance with the degree of change or deviation.

These and other prior art devices also experienced loss of desired welding results because of the inertia inherent in the apparatus for positioning both the welding head or torch and the probe itself. Such inertia evidences itself both in delay in initiating corrections and in problems of stopping correctional movements, once correction is effected, i.e., overshooting.

With respect to the latter problem, some prior art devices lacked a positive braking mechanism and none provided effective means for braking the correctional movement in proportion to degree and/or speed of correction and in accordance with the magnitude of or attained by the correctional response.

Thus, the problem of coordinating the speed of correction with the degree of deviation or correction required has been recognized in the prior art, but none of the prior art devices suggested nor disclosed structure by which the same could be obtained in apparatus adapted to both seek and follow the seam and to correct for deviations without regard to their direction relative to the nominal basic direction of the guide surfaces and direction of movement of the detecting device and welding head. The problem is further aggravated when a deviation is large, especially transversely of the direction of the basic path, as the torch frequently advances longitudinally past the deviation before it has moved laterally, sufficient to "cover" the deviation.

And, further, none of the prior art devices has, in fact, proven effective in the art and on a commercial basis.

SUMMARY OF THE INVENTION

It is, therefore, a general object of this invention to provide a new and improved automatic guidance system in which a probe, or the like, seeks and detects a path, and causes a slave apparatus to vary its path in response to the path, and changes therein, being detected.

It is another object of this invention to provide a new and improved automatic guidance system which generates an instantaneous error signal upon deviation from or change in the path being followed.

It is a further object of this invention to provide new and improved automatic guidance system for following a path along variable vertical and/or horizontal directions which compensates for deviations and changes in the path at speeds continuously proportional to the magnitude of the change in the direction of or deviation from the path being followed and in the horizontal and/or vertical components of the path.

It is yet a further object of this invention to provide a new and improved automatic guidance system with a dynamic braking action proportional to the magnitude of the speed of correction attained by the system.

It is another object of this invention to provide a new and improved probe for an automatic guidance system which evidences an electrical condition continuously proportionally relatable to forces applied upon the surface following shaft thereof, which condition instantaneously changes to reflect changes in the force applied thereto.

It is another object of this invention to provide a new and improved electrical circuit and parts thereof and means for controlling positioning motors in an automatic guidance system, in response to the electrical condition of the probe, at variable speeds and directions.

It is still another object of this invention to provide a new and improved electrical circuit and means for limit disabling an automatic guidance system.

It is yet another object of this invention to provide a new and improved electrical circuit and means for controlling positioning motors in an automatic guidance system by phase firing an SCR network to supply a DC voltage of controlled magnitude and polarity thereto.

Other objects of this invention include the provision of a new and improved guidance system for automatic welding apparatus, and the like; which is effective and efficient in operation; which induces a correction to the probe and to the operation head of the apparatus, if separately positioned; which is continuously proportional to the degree of change or deviation horizontally and/or vertically in the basic path; which responds to a continuously variable electric quantity, parameter or quantum or information to effect proportional correction of the slave mechanism; which terminates correctional movement with a force proportional to the magnitude of the correctional speed at the time termination is initiated; which is responsive to a continuously variable resistance to provide a correctional speed proportional to the degree or magnitude of deviation from or change in the basic path being followed; which utilizes a mechanically fixed resistance element to provide a variable signal for controlling the positioning motor; which is effectively isolated from interference during critical operational sequences, such as limit disabling from electronic noise and other deleterious effects; which utilizes new and improved electronic coupling means to affect other objects and advantages of this invention; which ensures positive control of the variable response device; which is safe and efficient in operation; which includes means electrically isolating the electric components from the probe while positively engaging and controlling the responses and movements thereof; which operates and controls the operating means for the device providing a continuously variable electrical information, parameter or characteristic against a spring bias to ensure smooth, continuous and effective operation; which is readily adapted for use with existing automatic guidance systems; which is operable with probes having a selective bias, including electrical bias in one or more directions; and which provides a response proportional to the magnitude of change or deviation without being responsive to or deleteriously affected by frictional forces normally found in the operation of such guidance systems.

Still another object of this invention includes the provision of a new and improved probe for an automatic guidance system to provide a signal for controlling a positioning motor which obtains one or more of the objects and advantages set forth herein and to provide such a probe which is selectively electrically biased in one or two directions.

A still further object of this invention is to provide a new and improved guidance system, new and improved parts and portions thereof, and new and improved electrical circuits, and means obtaining one or more of the objects and advantages set forth herein.

These and other objects, features and advantages of this invention will become apparent to those skilled in the art from the following detailed description of preferred embodiments thereof, read in conjunction with the accompanying drawing.

BRIEF DESCRIPTION OF THE DRAWING

Like reference numerals in the respective figures denote like parts. Various ones of the parts illustrated in the figures have been exaggerated in size of dimension for clarity of illustration and ease of description.

DESCRIPTION OF THE PREFERRED EMBODIMENTS

Briefly, this invention provides an automatic guidance system for maintaining the position of a following apparatus along a predetermined path having vertical and horizontal surface components and motion relative to the guidance system and apparatus. The guidance system includes a probe, for detecting and following the path, having means for presenting a continuous electrical condition relatable to the direction, and its rate of change, of the path. The system includes means controlled by the continuous electrical condition for positioning the probe and following apparatus. The speed and direction at which the probe and following apparatus is positioned by the positioning means is determined by the continuous electrical condition and is proportional to the magnitude of the change or deviation detected.

The invention also includes a probe for detecting the direction, and its rate of change, of an elevation upon or change in a surface in relative motion with respect to the probe. The probe includes a probe shaft carried within a body member or housing and having a surface contacting portion or finger rotatable about a point within the body by a force upon the surface contacting portion. The invention also includes means providing a continuously variable electrical resistance signal, such as a slide wire potentiometer, which is affected by the change in position of the probe shaft and relatable to the direction, and its rate of change, respectively, of the surfaces or surface components being followed by the probe.

This invention also provides an electrical circuit, including a disabling circuit, for controlling a positioning motor wherein the disabling circuit includes an optical transistor having an emitter, collector, and a light-emitting activating diode. The emitter and collector of the transistor are so connected in the circuit that conduction by the optical diode disables the motor. The optical transistor is inoperative unless a normally closed switch is opened at a predetermined limit of travel of the positioning motor to impose a voltage upon the light-emitting diode to complete the optical connection, thereby disabling the positioning motor.

The word "elevation" is used herein to refer to the surfaces or surface components, in a spatial sense, which the probe follows, whether the surface or component goes up or down (if horizontal) or in or out (if vertical) or remains the same. The word comprehends both or specifically one of the horizontal and vertical surfaces or surface components against which the probe travels.

Figure 1:
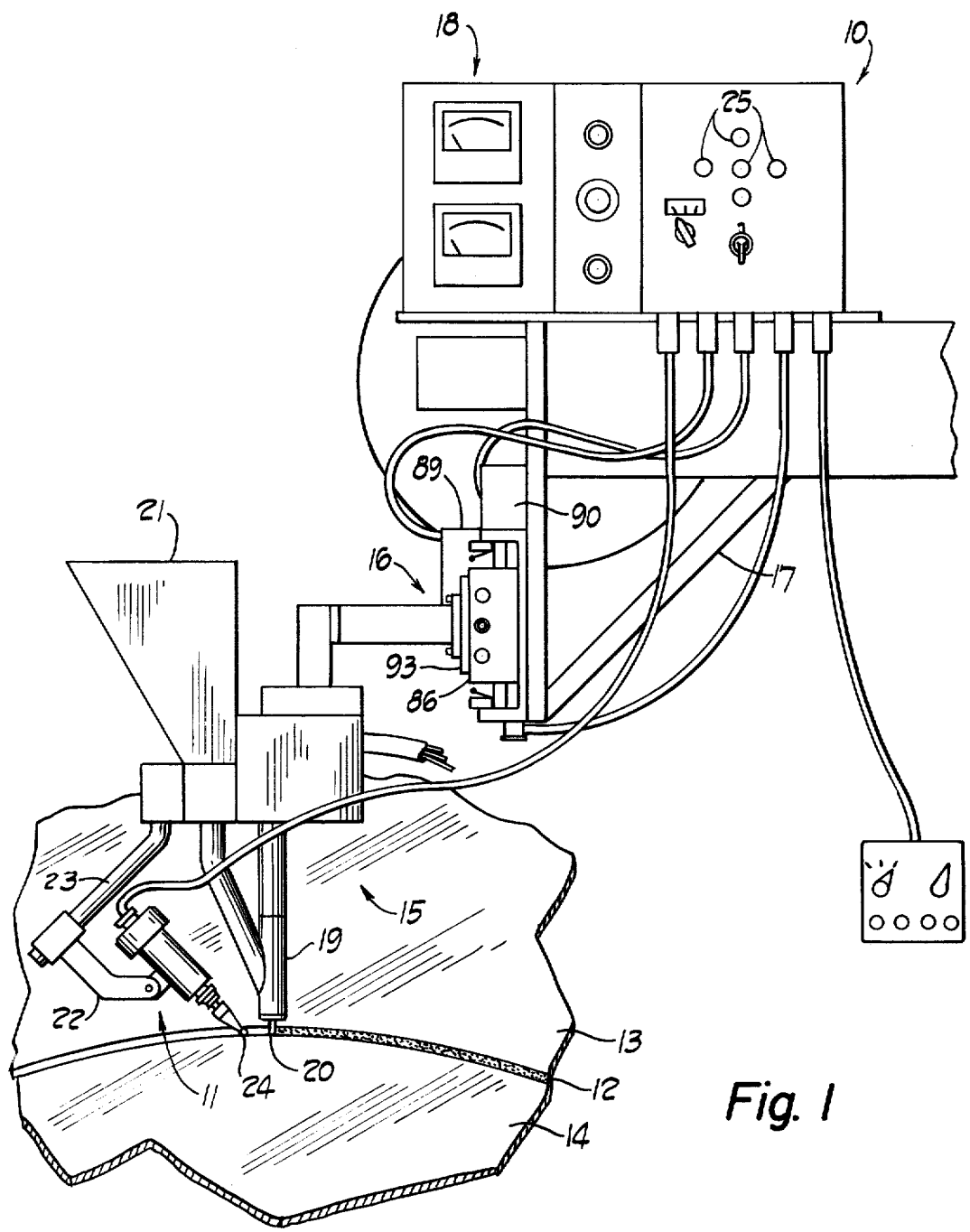
FIG. 1 is an illustration of a welding apparatus having an automatic guidance system embodying a preferred form of this invention.

Apparatus incorporating the system in accordance with the invention is illustrated in FIG. 1, showing use in connection with welding apparatus forming a lap weld. The guidance system, in accordance with the invention, includes a control assembly 10 electrically interconnected with a probe assembly 11, for detecting elevation differentials, such as the juncture 12 formed between surface 13 overlapping surface 14. The probe 11 is carried by the welding head 15, which, in turn, is carried upon a cross-slide 16, mounted upon a frame 17.

The welding head 15 and its associated control equipment 18, may be of any widely available type, but for illustration may be an arc welder having a nozzle tip or nozzle 19 from which welding wire 20 is expelled for use. A flux hopper 21 may also be included to feed flux through the welding nozzle 19 to the welding zone at the intersection 12 of surfaces 13 and 14.

The probe assembly 11, in this case, may be mounted directly onto the welding head by, for example, a brace 22 supported by a rod 23 connected to the head 15. The probe 11 may be carried by the brace and rod assembly at an angular position, as illustrated, with the tip or finger 24 of the probe positioned a short distance in front of the welding wire 20 of the welding head 15 in the general direction of travel of the welder over head 15 in the general direction of travel of the welder over the welding zone.

Alternatively, the probe could be mounted on a further single or bidirectional cross-slide carried on the head 15 or could be mounted on a separate cross-slide, similar to 16, as illustrated, and arranged to precede the cross-slide 16.

The probe 11 and welding head assembly 15 are moved vertically and horizontally in response to pressure exerted upon the probe tip or finger by the elevation along which the weld is to be made.

Thus, for example, the surfaces 13 and 14 may be moved or driven past the probe assembly 11 and welding head 15 and, ideally, the welding wire 20 and probe 11 follow any curved or circuitous path of the junction to be welded, as below discussed. Alternatively, the workpiece may be stationary and the welding apparatus advanced thereover. The important thing being that there be relative movement between the workpiece and the probe and torch so that the path has motion relative to the probe and, more importantly, the probe tip.

Also, it is noted that various types of elevations may be encountered; for instance, the elevation presented by a lap joint, as illustrated, in which a wall extends upwardly from a lower surface of substrate to define the junction and, additionally, perhaps simultaneously, a vertical displacement in the junction such as may be defined by a dip or ridge (not shown) extending in a direction transverse to the travel of the welding head assembly 15. It should be appreciated, also, that although a laptype joint is illustrated, and the invention is described herein with the primary reference thereto, the guidance system of the invention is equally usable with respect to other type paths or elevations as may be encountered, for example, in U or V-shaped grooves, along the apex of a ridge, or the like. To indicate the instantaneous speed and direction of the correction apparatus 16 (cross-slide), the control panel 10 may conveniently include a plurality of lights 25 or other indicating devices.

Figure 2:
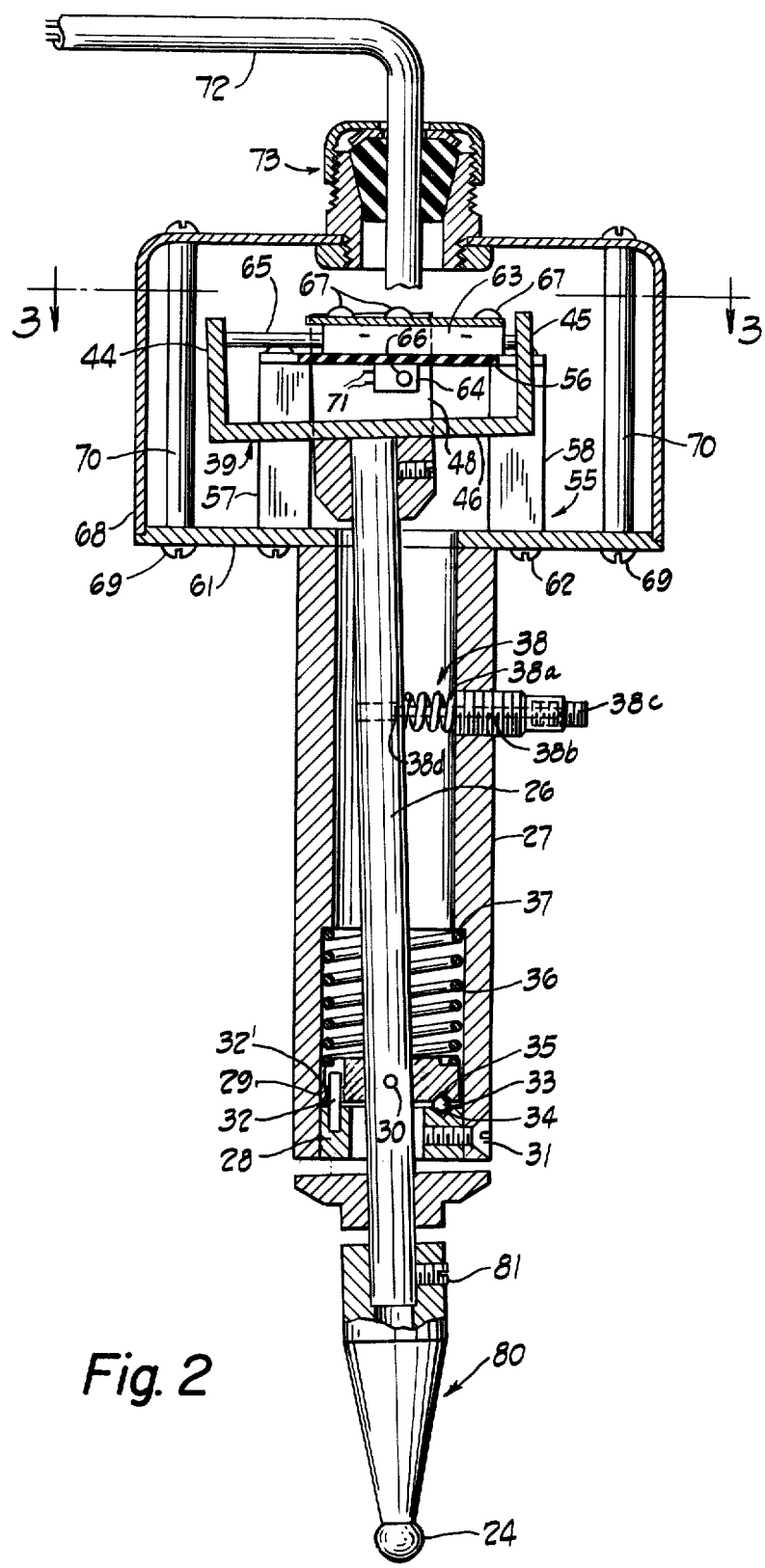
FIG. 2 is a cross-sectional view of the probe of FIG. 1 embodying this invention.

As shown in FIG. 2, the probe 11 includes a probe shaft 26 essentially coaxially disposed within a housing 27 of cylindrical or other convenient shape. The probe shaft 26 extends through and is maintained in position by collars 28 and 29, being pinned, by pin 30, to the upper collar 29. The lower collar 28 is secured within housing 27 by screws 31, or the like. A pin 32 is mounted on lower collar 28 and loosely engages within an aperture 32' in upper collar 29 to prevent relative rotation between the collars. A ball 33 is disposed within recesses 34 and 35 of collars 28 and 29, respectively. Thus, ball 33 provides a pivotal support between the probe housing 27 (via the collar 28) and the probe shaft 26 (via the collar 29) which, since it is eccentric of the axis of the probe shaft and since the engagement between pin 29 and aperture 32' is loose in all directions, permits the probe to respond to any horizontal or vertical change or combination thereof with a motion which provides the proper vector (horizontal and vertical) components of the change or deviation. Maintaining a downward and a horizontal centering pressure upon the collar 29 is a spring 36 which exerts pressure against the interior shoulder 37 of the housing 27.

Spring means, indicated generally at 38, FIG. 2, is provided between the interior of housing 27 and shaft 26 at a position more remote from tip 24 than the pivot 33. Spring means 38 exerts a lateral pressure on shaft 26 and is so positioned radially relative to the shaft, and direction of probe travel as to displace the probe in a direction signalling a downward movement, i.e., to impose a downward bias on the probe and, therefore, the positioning apparatus 16.

The individual or combined pressure of springs 36 and/or 38 forces the shaft 26 to pivot about the ball 33, when no pressure is exerted on the tip 24, thus providing an initial deflection of shaft 26 corresponding to a down motion of the apparatus, as soon as the control system 10 is first actuated.

Spring means 38 preferably includes a coil spring, or the like, 38a, which urges the shaft in the direction and for the purpose just indicated, a tension member, means or wire 38b and adjusting means 38c engaging tension means 38b and functionally accessible from without the housing to adjust the tension or effective length of the member 38b to regulate the pressure exerted on shaft 26 when it is displaced in a direction normal to the plane of FIG. 2, or, more particularly, to provide supplemental pressure to spring 36 in this normal direction so that the probe will not respond to the frictional force occasioned by the engagement between the tip 24 and the surface upon which the tip is riding and which is being sensed thereby, but will respond to changes and deviations therein from the original elevation.

Note, also, the aperture 38d through which tension member 38b passes through the probe shaft is sufficiently large relative to the size of the tension member 38b so that the probe may pivot about the transverse axis, i.e., about the axis parallel with the page of the drawing, without interference.

Figure 4:
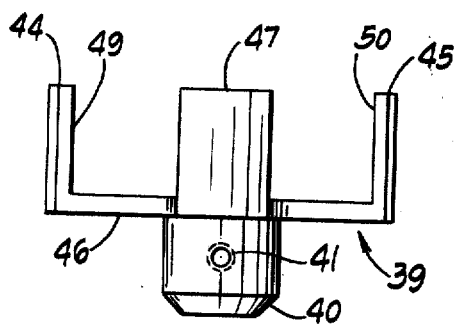
FIG. 4 is a front plan view of the potentiometer positioning apparatus or yoke of the probe of FIGS. 1, 2 and 3 embodying a preferred form of this invention.
Figure 4A:
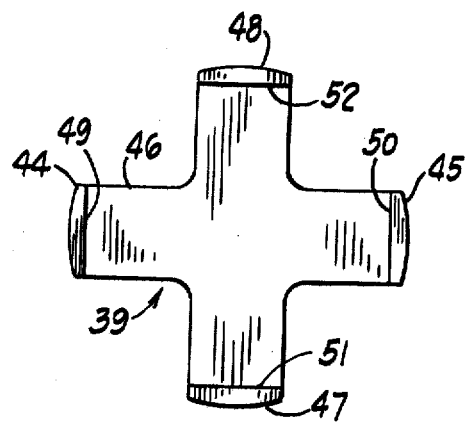
FIG. 4A is a top plan view of the potentiometer positioning apparatus of FIG. 4.

Mounted atop the shaft 26 is a frame or yoke member 39, the details of which are shown particularly in FIGS. 4 and 4A. The frame 39 has a base 40 which may include a set screw 41, or the like, to engage the top of the shaft 26. As shown in FIGS. 4 and 4A, the yoke 39 has a first set of two upstanding members 44 and 45 oppositely disposed on an essentially flat base 46, and a second set of upstanding members 47 and 48, likewise complementary, but arranged at right angles to the first set of upstanding members 44 and 45. The inward surfaces 49, 50, 51 and 52 of respective upstanding members 44, 45, 47 and 48 are of flat configuration to enable the variable resistor-actuating arms contained between the upstanding members to engage their respective upstanding members at any point thereof within its width, as will become apparent.

Figure 3:
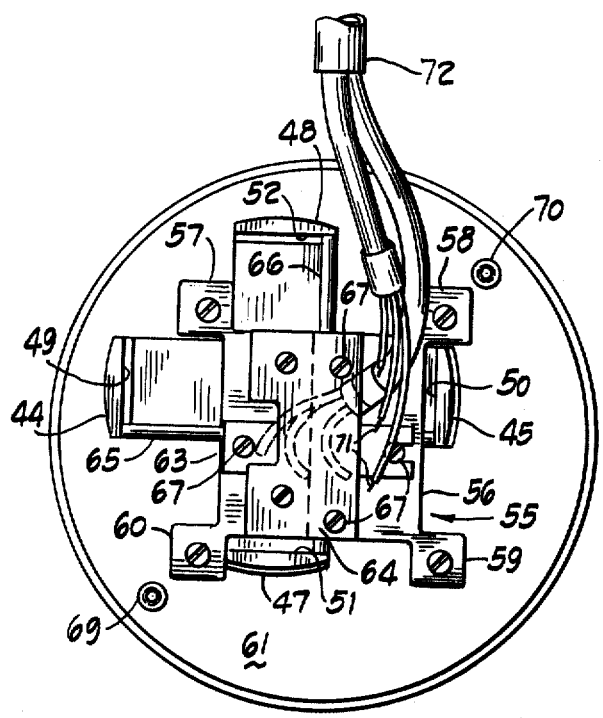
FIG. 3 is a top plan view of the probe of FIGS. 1 and 2 taken at 3—3 in FIG. 2.

A second frame, 55, shown in FIGS. 2 and 3, is fixedly mounted on the probe housing. The frame 55 includes a substantially flat plate or platform 56 supported by leg members 57, 58, 59 and 60 so as to be disposed within the confines of yoke 39. Legs 57, 58, 59 and 60 are affixed to a base plate 61 as by screws 62, or the like. The base plate 61 is attached by welding or otherwise (connection not shown) to the probe body 27, and may conveniently be of round shape as shown in FIG. 3, or may be of any other easily fabricated shape.

Affixed to the platform 56 are two variable resistors 63 and 64 having rods 65 and 66, respectively, extending therethrough and engaging the faces of upstanding members 44 and 45, and 47 and 48, respectively. Each of the rods 65 and 66 vary the resistance presented by its respective resistor as its position within the resistor body is changed. The resistors 63 and 64 may be attached to the horizontal plate 56 by any convenient means, screws 67 being shown for illustration.

The frames 39 and 55 and the resistors 63 and 64 are enclosed by a cover member 68 which engages base plate 61 and which may be bolted thereto by bolts, or the like, 69, within spacing rods 70, FIG. 2.

Electrical connections (not shown) may be made to the tab 71 on resistors 63 and 64. The cable 72, FIG. 2, containing the wires for connection with the interior of the probe conveniently enters through a sealing cap 73 in the cover 68 of the probe assembly.

To follow the elevation along the path (seam) on which the weld is desired, a probe tip 24, supported in holder 80, of generally conical shape, is provided. The holder 80 is held in place upon the shaft 26 by any convenient means such as screw 81. For accurate detection of the elevation, an appropriate sensing structure, such as tip 24, is supported in holder 80. The rounded ball-like shape of the probe tip 24 is used to advantage in sensing elevation differentials as exist in conjunction with a lap joint, or the like. Various other shapes may be employed for tip 24, however, consistent with the particular elevation to be followed or tracked.

The probe assembly 11 is disposed at an angle, conveniently about 45°, with the horizontal surface (or surface component) against which the probe operates.

Because of the tilted posture of the probe, upward and downward pressures applied to the tip 24 perpendicular to the surface upon which the probe tip rides, for example, by elevation differences in the surface itself are reflected as resistance changes in resistor 63. The probe assembly 11, therefore, presents changes in resistance 63 which are relatable to the magnitude and direction of the force exerted upon the probe tip 24 by the horizontal surface or component of the elevation being followed and changes and deviations therein.

Similarly, forces applied laterally, from the right or left of the probe tip 24 as the case may be, are transmitted by the probe shaft 26 by pivoting on ball 33 about an axis essentially perpendicular with the page in FIG. 2, thereby positioning the shaft 66 of the resistor 64.

Figure 5:
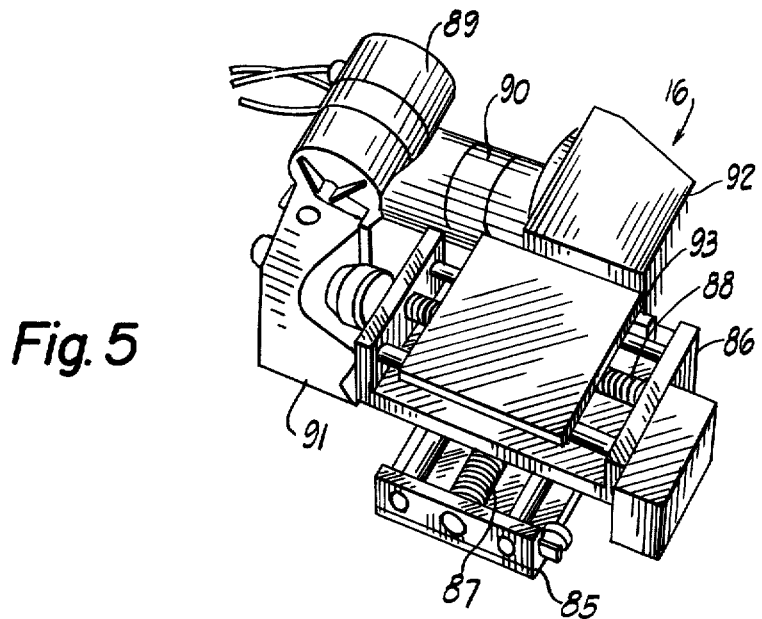
FIG. 5 is a perspective view of a cross-slide which may be used with the automatic guidance system embodying this invention.

To effect a change in direction of the probe assembly 11 and welding head 15, a cross-slide assembly 16, illustrated in FIG. 5, is provided. The cross-slide assembly 16 includes cross-slides 85 and 86 having screw shafts 87 and 88 driven by motors 89 and 90, respectively, through appropriate gear boxes 91 and 92. Cross-slide 85 is affixed to frame 17, cross-slide 86 is mounted on screw shaft 87 and the welding head 15 (see FIG. 1) is affixed to mounting plate 93 carried on cross-slide 86 in a manner such that motor 89 effects horizontal (or left and right) movements and motor 90 effects vertical (or up and down) movements of the probe and welding head.

Figure 6:
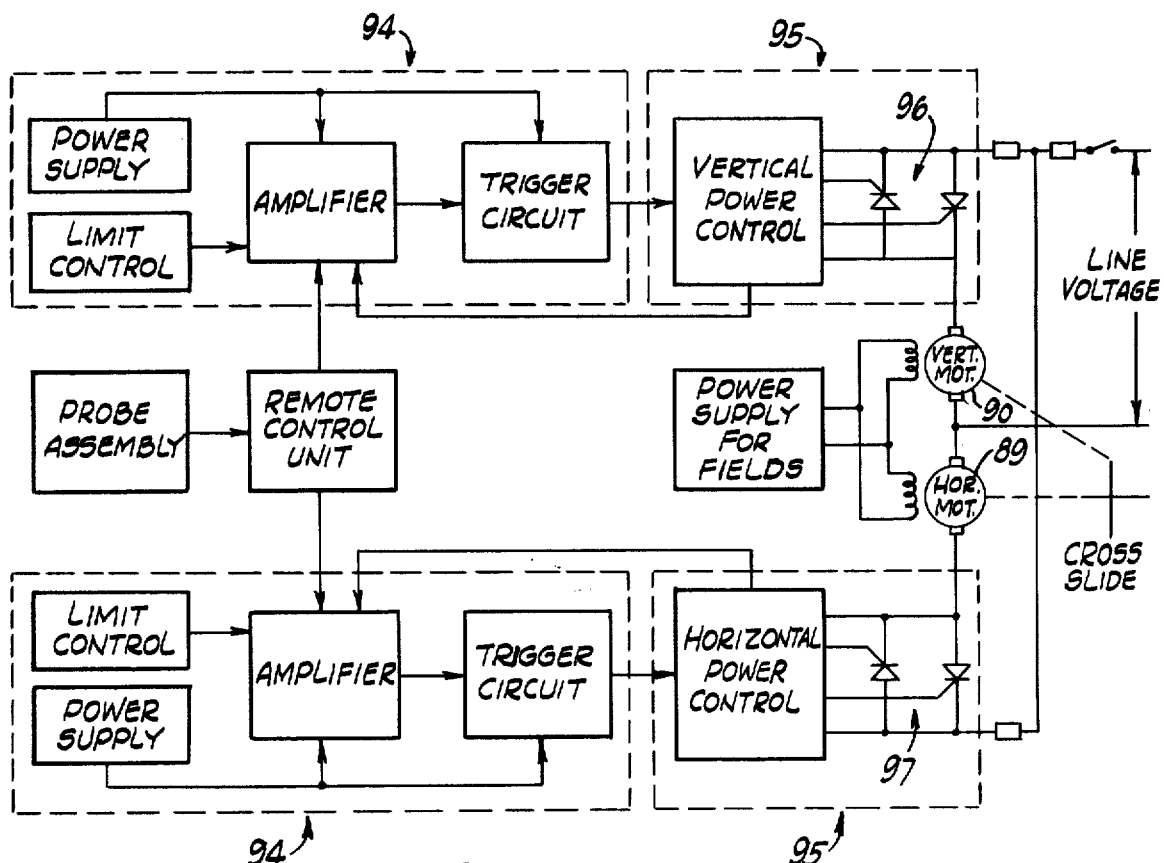
FIG. 6 is a block diagram illustrating generally the guidance system embodying this invention.
Figure 7:
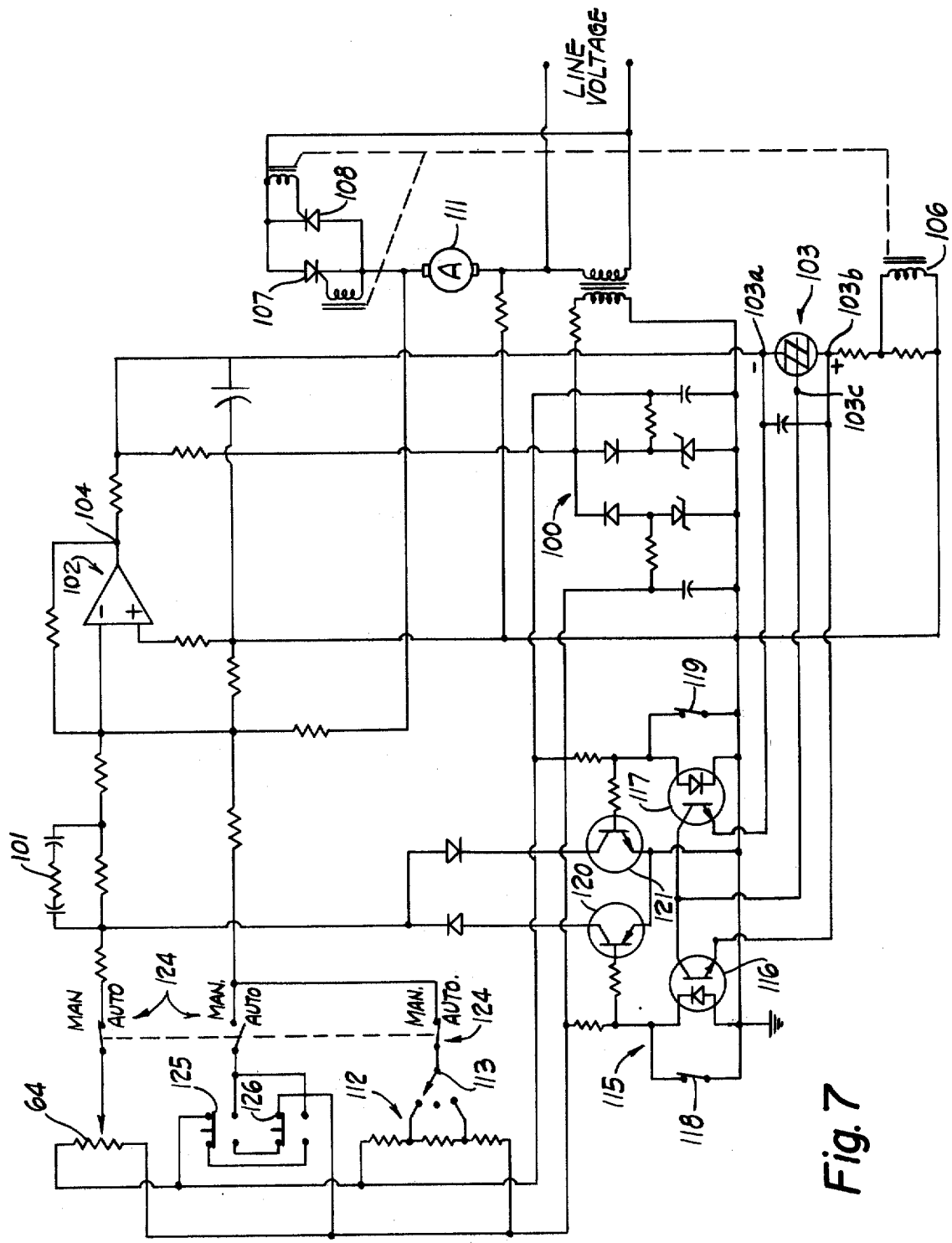
FIG. 7 is a schematic diagram of the control circuitry in accordance with the invention for one of the apparatus positioning motors.

The circuitry to operate the motors to position the probe and welding head, illustrated in FIG. 6 in box diagram form, and schematically, in part, in FIG. 7, includes identical horizontal and vertical circuits, only one shown in FIG. 7. Conveniently, the circuit may be modularized with the power supply, amplifier and trigger circuits, in a plug-in module, denoted by the broken line in FIG. 6 and denoted generally by the reference 94. Likewise, the power controls and their associated circuitry may be provided in separate identical modules, shown by the broken lines indicated by the reference numeral 95. Thus, two identical circuits are provided, one for operating horizontal motor 89, the other for operating the vertical motor 90.

In general, as shown in FIG. 6, voltages impressed across the resistance in the resistors 63 and 64, respectively, of the probe assembly 11 are amplified and applied through a trigger circuit to the appropriate power control. The power control effects the firing of one of the SCR networks 96 and 97 through which the line voltage is applied to the horizontal motor 89 and vertical motor 90, respectively. The trigger circuit generates pulses timed with respect to a reference phase of the applied line voltage corresponding to the magnitude and direction of the force on the probe tip 24 (see FIG. 2) in order to actuate the vertical or horizontal motors to correct the path of the welding head, up or down, or left or right, or a vector combination thereof, and probe assembly.

A particular advantage gained in using the phase-firing technique herein is that pressures on the probe tip resulting in an instantaneous resistance change of resistor 63 or 64 causes an immediate application of power to the appropriate motor, 90 or 89, respectively, of the proper magnitude and polarity to achieve the desired correction. Thus, a positive braking action may be instantaneously applied against the mass of the welding head and probe assembly, if needed.

The voltages of the probe assembly may be applied to the horizontal and vertical amplifiers through a remote control unit, FIG. 1, for manual guidance, if desired. Additionally, a limit control for the horizontal and vertical circuits may be inputted into the amplifier for disabling the circuit, if the cross-slide should reach the desired end of travel.

The schematic diagram of the circuit for achieving the phase-fired power to be applied to one of the appropriate cross-slide motors, for example, the horizontal drive motor 89, is illustrated in FIG. 7. The circuitry for the horizontal and vertical motors being the same, an identical circuit may be used to drive the vertical cross-slide motor 90.

In essence, the circuit of FIG. 7 includes a voltage supply circuit 100 to provide a DC voltage across the variable resistor 64 of the probe 11, and, additionally, to provide a clipped sine wave to the summing junction 104. The DC voltage on the resistor 64 is applied through a signal-routing capacitor circuit 101 to an operational amplifier 102. The output from the operational amplifier 102 is a DC level determined by the resistance setting of the probe resistor 64 and is summed at point 104 with the clipped sine wave signal from the voltage supply circuit 100. The composite signal is then applied to a trigger pulse generator device or bidirectional switch represented by box 103. The timing or phase of the trigger pulses generated by device 103 with respect to a reference phase of the line voltage depends upon the DC level of the signal at point 104. A higher DC level causes a pulse to be generated earlier in a particular half cycle of the clipped sine wave, while a lower DC level causes a pulse to be generated later in the particular half cycle.

Trigger pulse generator 103 is preferably a silicon bi-directional switch available from Motorola Semiconductor Products, Inc. as part No. MBS4991 or MBS4992. Pulse generator 103 has anodes 103a and 103b and a gate 103c. Gate 103c is operative only for limit disabling as described below.

The trigger pulses occur once per cycle of the clipped sine wave and the line voltage and in the positive or negative half cycle according to whether the DC level at point 104 is positive or negative, respectively. The magnitude of the DC level determines the timing of the trigger pulse in the particular half cycle of clipped sine wave, while the particular half cycle of clipped sine wave serves to initiate the trigger pulse. The trigger pulses from generator 103 are applied through transformer 106 to the gates of both SCR 107 and SCR 108. SCR 107 and SCR 108 are connected in opposite directions so that, for example, SCR 107 will fire on the half cycles of line voltage in which its anode is positive when a pulse is applied to its gate and SCR 108 will fire on the opposite half cycles when a pulse is applied to its gate. Since pulses occur only on one or the other half cycle, only one SCR is triggered on each cycle. Thus, power of appropriate polarity is applied to the armature 111 of motor 89 (see FIG. 5), to move the probe 11 in the proper direction to decrease the force applied thereto to vary the resistance setting of resistor 64 until the DC level at the output of operational amplifier 102 reaches a zero or null point.

Additionally, because the magnitude of the DC level from the operational amplifier 102 varies the timing of the pulses generated by the pulse generator 103 with respect to the reference phase of the line voltage, the average value of the rectified voltage applied to the armature 111 will be varied, and, therefore, the speed of the motor will be varied accordingly. Thus, for instance, it will be appreciated that the higher the level of the operational amplifier output voltage, the sooner in the line voltage cycle SCR 107 or 108 will fire and the greater the average voltage applied to the motor. It can be seen, therefore, that the higher the level of the output voltage from operational amplifier 102 (representing a large force on the tip 24 of the probe 11), the faster motor 89 will run. The limit, of course, is the condition in which full power (representing, essentially, the entire rectified half cycle of the line voltage) is applied to the armature 111.

As mentioned above, in many instances, such as in applications involving a lap joint weld, or the like, it is desirable to "preload" the probe 11 to require a particular force, left or right, or up or down, with respect to the vertical circuitry, to exist on the probe tip 80 at an equilibrium state. Thus, in effecting a lap joint (as illustrated in FIG. 1) it may be desirable to define as an equilibrium state a condition in which a particular force exists between the tip 24 and the edge of the upper plate 13 whereby movement of the probe away from the edge of the plate 13 creates a determinable voltage difference in the resistor 64, just as if a force in the opposite direction were being applied.

Such "preload" condition is achieved electrically by a resistor circuit 112 (FIG. 7) by which a desired resistance section with its corresponding voltage drop may be selected by a rotary switch 113, or the like, and applied to an input of the operational amplifier 102 to be balanced against the input from resistor 64. Because the resistances in the resistance network 112 are fixed, the initial selection of a preload setting will unbalance the circuit and cause an output to be generated from the operational amplifier and appropriate trigger pulses to be generated to cause power to be applied to the armature 111 through the appropriate SCR of network 97. The probe 11 will then be moved, the pressure upon it varied to change the voltage across resistor 64, and the output from the operational amplifier 102 maintained at zero or null.

Thus, with a selected preload setting in the circuit, the probe will have a quiescent mechanical condition exerting force upon the elevation or edge of the plate 13. Movement, therefore, of the probe away from the elevation or ridge is detected by the circuit as negative pressure, and the motor 89 will be actuated to reestablish the quiescent pressure condition.

Another feature of the circuit is the limit disabling circuit 115 which utilizes two optical transistors 116 and 117. When a limit of travel is reached upon the horizontal cross-slide 86, the appropriate one of the limit switches, 118 or 119, at the ends of slide 86 is engaged or operated by the "plate" traveling on the screw and is opened, causing the light-emitting diode within the appropriate transistor to conduct and emit light. The diode, thereby, causes the transistor to conduct and disable the trigger pulse generator 103 by connecting gate 103*c* directly to the appropriate anode 103*a* or 103*b*.

Additionally, transistors 120 and 121 are provided, the appropriate one of which conducts when current flows through the diode of transistor 116 or 117, respectively, to bypass the voltage input to operational amplifier 102 to ground and disable the horizontal drive motor 89. The sudden signal change produced by conduction of the appropriate transistor 120 or 121 is coupled through the capacitors in circuit 101 to operational amplifier 102. The signal so coupled is momentary and in such a direction that the output of amplifier 102 is driven momentarily to the polarity opposite that which produced the limit condition. As a result, a few trigger pulses are produced to fire the SCR 107 or 108 not previously conducting and apply, for a few cycles, voltage of the opposite polarity to armature 111 to produce dynamic braking of motor 89.

The use of optical transistors in the limit circuit facilitates efficient operation in isolating the limit circuit from the trigger pulse generator to prevent false triggering therefrom or from noise existent in the surrounding atmosphere.

If manual control of the positioning motor is desired, the ganged switches 124 may be operated to the manual positions illustrated. With switches 124 in the manual position, pushbutton switches 125 and 126 may be individually operated for the desired horizontal positioning.

It will be appreciated that, as explained above, the circuit of FIG. 7 is illustrated and described with respect to the horizontal positioning of the probe 11 and the welding head 15 upon which it is carried. However, a second identical complementary circuit for vertical control may be used, except, of course, that it is applied to the vertical cross-slide 85, and applies to up and down movement of the probe and welding apparatus.

Another preferred form of apparatus or means for actuating and controlling the resistors 63 and 64 to continuously vary them in response to a change or deviation detected by the probe and thereby to control the positioning motors, is indicated generally at 130 in FIGS. 8 through 11, inclusive.

While this form of apparatus for controlling, ultimately, the speed of the respective positioning motors to vary the same in proportion to the magnitude of the intended correction, as well as the form described, is shown in connection with a resistance which is or is adapted to be continuously variable, it is understood that other electrical conditions, characteristics or elements, such as voltage or current, for example, may have information with respect thereto, varied continuously by the described apparatus, or apparatus within the concepts of this invention, all within at least a part of the concepts and precepts of this invention.

Figure 8:
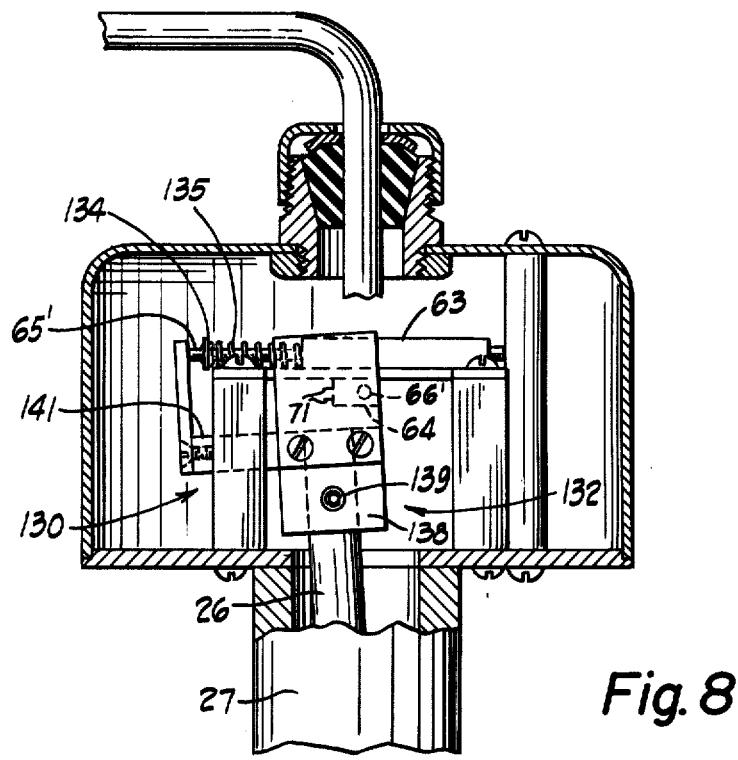
FIG. 8 is a broken view similar to FIG. 3 showing another potentiometer positioning apparatus embodying a preferred form of this invention.
Figure 9:
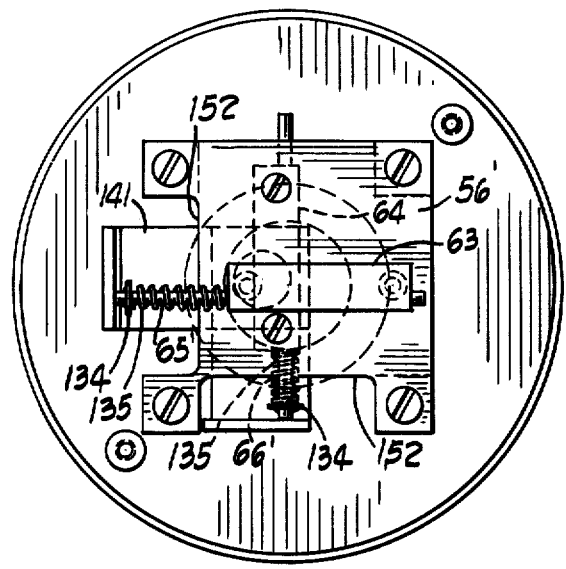
FIG. 9 is a top plan view of the apparatus shown in FIG. 8.
Figure 10:
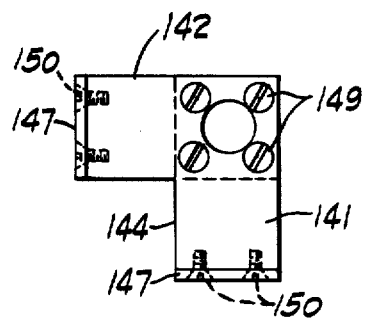
FIG. 10 is a top plan view of the yoke or pusher of the apparatus shown in FIG. 8.
Figure 11:
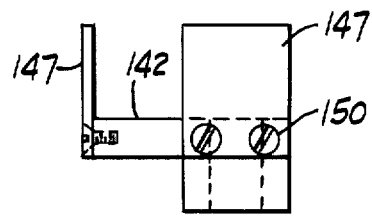
FIG. 11 is an elevational view of the yoke or pusher shown in FIG. 10.

In this form of the invention, the probe, including the parts thereof not shown in FIG. 8, is or may be the same as in the form described above.

The means to vary the electrical characteristic, i.e., resistors 63 and 64, also are or may be the same as those described above in connection with FIGS. 2 throughh 4A, inclusive.

In this instance, however, the yoke indicated generally at 132 (a) is adapted to be fabricated rather than machined, (b) is adapted to be spring-biased and, more importantly, to function in connection with a variable electrical characteristic or information which is both continuously variable and is biased in one direction, and (c) is adapted to provide electrical insulation between the variable electrical information or characteristic device and the probe and, therefore, the workpiece(s).

To this end, each actuating rod 65' and 66' for resistors 63 and 64, respectively, is provided with a transverse plate 134 which provides a bearing surface for one end of a coil spring 135 which encircles the actuating rod and acts between the edge of the associated resistor and the plate 134 to urge the rod outwardly in one direction, as shown.

Yoke 132 includes means for the yoke on the upper or inner end of the probe shaft for movement therewith, as well as means for engaging the end of each rod 65' and 66' adjacent the plate 134 to displace the associated rod, 65' or 66', as the case may be, against the force of spring 135 to vary the resistance continuously, in relation to the probe tip movement, to control the appropriate positioning motor to and for the purposes taught herein.

To this end, yoke 132 includes a collar 138 or other appropriate means for mounting on the shaft 26, secured in position by a set screw 139, or other means, and a plate member 141 which conveniently is L-shaped to provide two extensions or legs 142 and 144 which extend outwardly so as to terminate in the vertical plane in which the rods 65' and 66', respectively, terminate.

A vertical member 147 is secured to the end of each extension 142 and 144 and is of sufficient height to engage and bear upon the end of the adjacent rod 65' or 66' and of sufficient strength to transmit the force of the shaft 26 thereto to displace the same, to vary the resistance, against the force of spring 135.

Further, in order to isolate the probe shaft and, thereby, the workpiece, all or part of the yoke 132, such as vertical members 147, for example, are, preferably, fabricated of an electrical insulating board, or the like.

Plate 141 is secured to collar 138 by suitable means, such as screws 149, and members 147 are likewise secured to plate 141 by suitable means, such as screws 150.

Also, plates 56', which supports the resistors, needs, in this instance, only to be cut out, as at 152, on two sides in order to permit the required movement of the yoke, since the yoke has only two vertical members. The cutouts 152 are so sized as to function as stops to limit the movement of the yoke 132 in the direction against spring 135 so as not to exceed the limits of the associated resistance (potentiometer).

Finally, while collar 138, plate 141 and vertical members 147 have been described as separate members, one or more of them could be formed as a unit, and the same principle of a fabricated yoke and/or a yoke providing an insulation means intermediate the resistors and the workpieces may be adapted for the yoke, shown in FIGS. 2 through 4A, inclusive.

Modifications, changes and improvements to the preferred forms of the invention herein particularly disclosed and described may occur to those skilled in the art who come to understand the principles and precepts thereof. Accordingly, the scope of the patent issued herein should not be limited to the specific forms of the invention herein particularly illustrated, disclosed and described but only consistent with the advance by which the invention has promoted the art.

We claim:

1. A probe for detecting the direction and its rate of change of an elevation upon a surface in motion with respect to the probe, comprising:
   a body,
   a probe shaft carried within said body and having a longitudinal axis with a surface portion at the end thereof, said probe shaft being pivotable in all directions about a point eccentric of said axis by one or more forces acting upon said surface contacting portion,
   means for presenting continuous variable electrical resistance changeable by said pivoting of said probe shaft, thereby presenting a resistance change proportional to said pivoting of said probe shaft, and rotatable to the direction and its rate of change of said elevation with respect to the direction of motion between said probe and said elevation.

2. The probe of claim 1, wherein said body is disposed at an angle with respect to said surface, whereby the variable resistance presented is changed by forces upon said probe shaft horizontal and vertical to said surface.

3. The probe of claim 2 further comprising:
   first frame means mounted upon said probe shaft remote from said surface contacting portion,
   second frame means carried upon said probe body, and said means for presenting a continuous electrical condition including
   two variable electrical resistors mounted upon said second frame means, each having a rod extending therethrough and at 90° to each other to vary the resistance thereof, each of said rods extending in operable location with said first frame means and being moved thereby in accordance with said pivoting of said probe shaft.

4. The probe of claim 3 wherein said body is disposed at an angle of approximately 45° with respect to the surface, whereby when the surface contacting portion of said probe is pivoted in a direction parallel to the surface, the resistance of one of said two variable resistors is changed and when the surface contacting portion of said probe is pivoted in a direction perpendicular to the surface the resistance of the other of said resistors is changed and wherein said surface contacting portion is pivoted in a direction intermediate or the vector combination of said first two stated directions, said resistors are moved in the same vector proportions.

5. Means for continuously transmitting the response of a surface detecting device to a continuously variable source of electrical information wherein said source is mounted on a plate in a fixed position relative to said means and is varied by an actuating rod having ends disposed in operable relation to said means and said device has a shaft which is pivoted in proportion to the change in said surface, said means comprising yoke means carried by said shaft and engaging at least one end of said actuating rod to displace the same to vary said electrical information the displacement of said yoke being limited by the plate mounting said source.

6. The means according to claim 5 wherein said plate further functions as a stop to limit the movement of said actuating rod.

7. The means according to claim 5 in which said yoke means engages both ends of said rod to positively displace the same in each direction.

8. The means according to claim 5 with two such sources of variable information mounted at 90° to each other.

9. The means according to claim 7 in which said yoke means engages both ends of said rod to positively displace the same in each direction.

10. The means according to claim 9 in which said yoke means including electrical insulating means intermediate said rod and said shaft to electrically isolate said source of variable information from said shaft.

11. The means according to claim 10 in which said source of variable information is a continuously variable resistor.

12. The means according to claim 8 in which each said rod is biased in one direction by spring means and said yoke includes means engaging each said rod at the end in the direction of said bias.

13. The means according to claim 11 in which said yoke means includes electrical insulating means intermediate said rod and said shaft to electrically isolate said source of variable information from said shaft.

14. The means according to claim 13 in which each said engaging means is an electrical insulator and comprises said electrical insulator means.

15. The means according to claim 12 in which said source of variable information is a continuously variable resistor.

16. The means according to claim 5 in which said rod is biased in one direction by spring means and said yoke includes means engaging said rod at the end in the direction of said bias.

17. In a probe having a housing, a shaft with an end for contacting and detecting a surface and a pivot point, the improvement of means to bias the probe shaft in a predetermined direction and to overcome the affects of friction on the response thereof, said means comprising spring means acting between said housing and shaft at a point more remote from said end than said pivot point to urge said shaft in a predetermined direction, tension means interconnecting said shaft and said housing to oppose said spring means, and means operable from without said housing for adjusting the effective length of said tension means.

18. The means according to claim 17 with means whereby said shaft is pivotable in a direction at 90° to said tension means without interference therefrom within the degree of pivoting allowed for.

* * * * *